La R. & W. BARTLETT.
EXPANDING MANDRELS FOR TURNING PISTON RINGS.

No. 185,159. Patented Dec. 12, 1876.

WITNESSES:
Joseph E. Ware
J. G. Bissell

INVENTOR:
La Roy Bartlett
Winthrop Bartlett
by Joseph E. Ware Atty
St. Louis, Mo.

UNITED STATES PATENT OFFICE.

LA ROY BARTLETT AND WINTHROP BARTLETT, OF ST. LOUIS, MISSOURI.

IMPROVEMENT IN EXPANDING-MANDRELS FOR TURNING PISTON-RINGS.

Specification forming part of Letters Patent No. 185,159, dated December 12, 1876; application filed July 18, 1876.

*To all whom it may concern:*

Be it known that we, LA ROY BARTLETT and WINTHROP BARTLETT, of St. Louis, in the county of St. Louis and State of Missouri, have invented a new and useful Improvement in Tools for Manufacturing Piston-Packing Rings, which improvement is fully set forth in the following specification, reference being had to the accompanying drawings with their uniformly corresponding letters of reference.

The object of our invention is to more rapidly and truly center and finish metal piston-packing rings by one setting and tool operation, which we accomplish by the combination, with a chuck, of an expanding-mandrel, which, by the admission of varying-sized cones for expanding certain radiating fingers, can thereby be used to secure nearly every sized ring it is desired to finish. On each side of the chuck is a tool-holder and rest, in one of which, on the front side, are placed two cutters, $t'$ $t'$, for cutting the sides of the ring, and also a shoulder-tool for truing the ring preparatory to the action of the cutting-tools, while the tool D, on the opposite face of the ring, is to cut across its face, to thereby enable us to produce a piston-ring, mathematically centered and finished, sides and face, at one operation or chucking.

For a further understanding of our invention we proceed to describe and detail its parts.

Figures 1, 2:
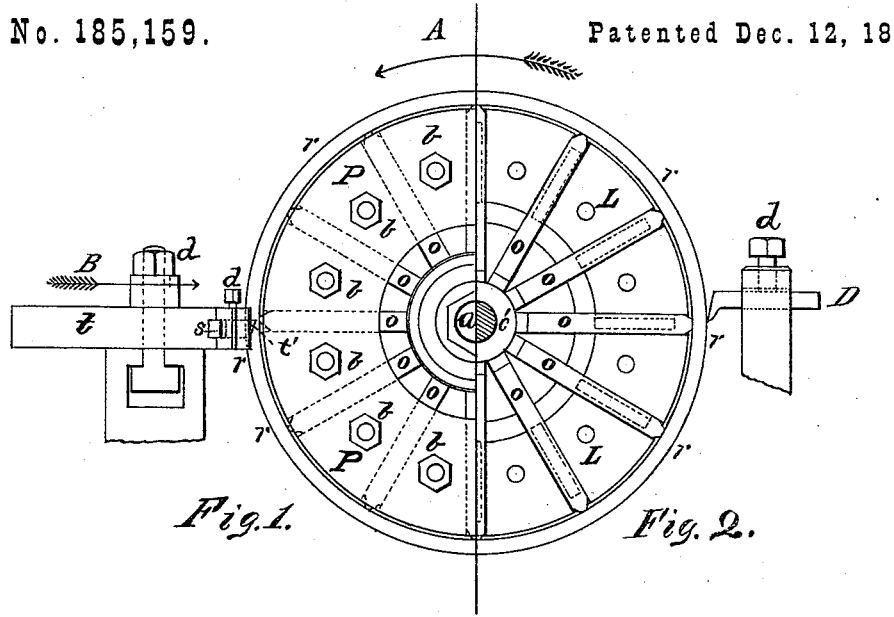
Figure 3:
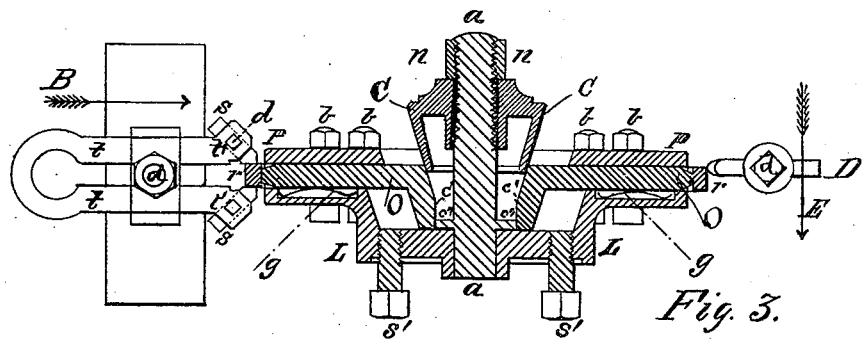
Figure 4:
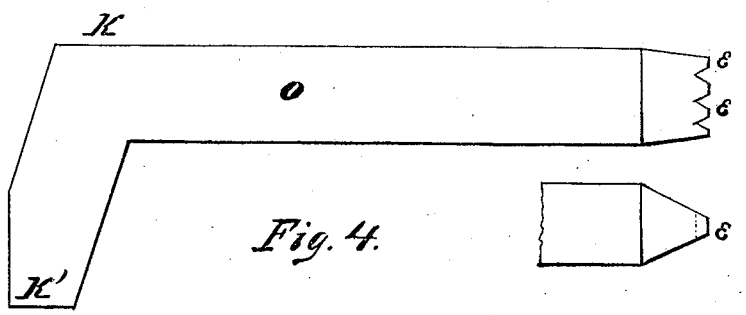

Figures 1 and 2 are elevation views; Fig. 3, a section through the center of the mandrel and chuck from D to $t$. Fig. 4 is a full-sized side and edge view of one of the radial fingers.

By way of detailed illustration, A, Figs. 1 and 2, is an arrow, showing the proper direction of lathe motion. B is an arrow, showing the direction of movement of the parallel double-sided cutter-holder and cutters. D is a cutter for finishing the face of the ring. E is an arrow showing the direction of movement of the reversed cutter for cross-facing. $a\ a$, Fig. 3, is a cone-guide stud. $b\ b\ b\ b$ are bolts for nuts to hold the face or front plate in position for work. C C is the expanding-cone. $c'\ c'$ represent cut-away portions of the knees of fingers O, (shown at K, Fig. 4,) to allow of greater radial play to said fingers. $c''\ c''$ is a collar around the base of the cone-stud $a$, to prevent the fingers from getting past the heel of the cone. $d\ d\ d$ are set-screws and nuts for holding the tools. $g\ g$ are friction-springs, one behind each finger O to keep it in position when the pressure of the cone is withdrawn. K, Fig. 4, is the knee, on finger O, to supply greater steadying support to the fingers against the cone C. L L is the main or back plate, in which are the radial grooves for the reception of the fingers O O, and in which the springs $g\ g$ are recessed to operate, as already described. $n\ n$ is a nut on the axial stud $a$ for pressing the cone. O O O are the radial fingers to be simultaneously expanded by the cone C acted on by the nut $n$ on the stud $a\ a$. P is the face or front plate of the chuck, and it is bolted over the fingers to the back plate L L by the bolts $b\ b\ b$, &c. $r\ r$ is the packing-ring in place, and trued for the proper action of the turning-tools $t'\ t'$ and the cross-facer D. S S are the ends of the tool-holders, either of which can be and is intended to be used as a shoulder to true the ring against. $s'\ s'$ are studs in the back plate to secure it to the lathe. $t\ t$ is the parallel-sided tool-holder, provided with seats for the cutting-tools $t'\ t'$. $e\ e\ e$, Fig. 4, represent the chamfered and nicked ends of the fingers, to render it nearly certain that no sand-lump, or other prominence on the cast ring, can prevent true centering. We prefer the edge when nearly sharpened to a point. We use ten or more of these radial fingers to better sustain and equalize the radial strain on the ring.

To operate our invention the ring cast in a truly circular cast-iron pattern is to be placed over the fingers while they are sufficiently withdrawn. By turning the axial nut $n$ the cone C C is pressed down, and extends the fingers to the inner face of the ring, centering and securing it, and leaving it ready for work, and when the tool-shoulder $s$ is brought up and the ring trued against it by turning the lathe, the tool-rest $t\ t$ is then set up so as to divide the cut on the ring. The lathe movement then feeds the cutters or tools $t'\ t'$ until the entire depth of the ring is cut perfectly parallel. In the meanwhile the cross-feed tool D has dressed the outer face of the ring, provided one cut sufficed to bring it to gage, sides and face; otherwise a second cut must be taken. Both tools may act simultaneously or consecutively. When the ring is finished the axial nut $n$ is unscrewed, and by a tap on the face of the ring the fingers slip on their springs and liberate the ring. In this manner we are enabled to perfectly finish from twenty to twenty-five rings in one day, being four times as much work as by the ordinary method.

We do not claim plain radial fingers to be set out or expanded by cones, for centering and holding in place piston-rings, nor radial fingers with reduced faces on their holding ends.

We claim as our invention—

The two-plate chuck on an expanding-mandrel, the rear or fore chuck-plate, having radial receptive grooves and recessed springs therein, to contain and safely retain in extension a suitable number of nick-pointed, clipped, and knee-shaped extensible fingers as worked therein by the mandrel-cone, in combination with tools $t'$ and D for sides and face finish, as held and supported, and to be suitably actuated on the oppositely-placed compound and plain holders and rests, all, when applied and operated, to center, true, and complete iron piston-rings in one operation.

LA ROY BARTLETT.
WINTHROP BARTLETT.

Witnesses:
JOSEPH E. WARE,
CHAS. E. WARE.